United States Patent
Newhouse et al.

(10) Patent No.: US 11,379,418 B2
(45) Date of Patent: Jul. 5, 2022

(54) FILE SYSTEM WARNINGS FOR MOVES OF SHARED CONTENT ITEMS

(71) Applicant: Dropbox, Inc., San Francisco, CA (US)

(72) Inventors: Benjamin Zeis Newhouse, San Francisco, CA (US); Alex Sydell, San Francisco, CA (US); Shi Cong, Sammamish, WA (US)

(73) Assignee: Dropbox, Inc., San Francisco, CA (US)

(*) Notice: Subject to any disclaimer, the term of this patent is extended or adjusted under 35 U.S.C. 154(b) by 480 days.

(21) Appl. No.: 15/393,684

(22) Filed: Dec. 29, 2016

(65) Prior Publication Data
US 2018/0189311 A1  Jul. 5, 2018

(51) Int. Cl.
*G06F 16/17* (2019.01)
*G06F 21/55* (2013.01)
*G06F 21/62* (2013.01)
*G06F 21/52* (2013.01)

(52) U.S. Cl.
CPC .......... *G06F 16/1734* (2019.01); *G06F 21/52* (2013.01); *G06F 21/554* (2013.01); *G06F 21/6218* (2013.01)

(58) Field of Classification Search
CPC .... G06F 16/1734; G06F 21/52; G06F 21/554; G06F 21/6218
See application file for complete search history.

(56) References Cited

U.S. PATENT DOCUMENTS

| 8,055,628 | B2 | 11/2011 | Margolus et al. |
| 8,205,150 | B2 | 6/2012 | Gelman et al. |
| 8,707,035 | B2 | 4/2014 | Hartley |
| 8,825,597 | B1* | 9/2014 | Houston ............. H04L 67/06 707/610 |
| 9,069,879 | B2 | 6/2015 | Hunter |
| 2005/0071390 | A1* | 3/2005 | Midgley ............ G06F 11/1451 |
| 2007/0233803 | A1* | 10/2007 | Stienhans ............ G06F 9/442 709/208 |
| 2008/0270481 | A1* | 10/2008 | Augustine ............ G06F 16/275 |
| 2009/0164534 | A1* | 6/2009 | Mercer ............... G06F 16/1734 |

(Continued)

OTHER PUBLICATIONS https://web.archive.org/web/20160501042407/https://support.google.com/a/answer/2789107 (Year: 2016).*

(Continued)

*Primary Examiner* — Matthew J Ellis
(74) *Attorney, Agent, or Firm* — Polsinelli PC

(57) ABSTRACT

The present technology operates in an application layer of an operating system on a client device of a content management system to monitor for changes to shared content items that are likely unintentional—for example the change might move a content item out of a shared space, or otherwise remove the shared content item from access by other users. The present technology can detect a content item change event on a client device, compare a source file system path for the content item change event with a destination file system path for the content item change event to determine a canonical move causing the content item change event, determine that the canonical move was likely unintentional; and display a notification informing the user that a content item change that was likely unintentional was detected and then allow the user to either confirm or deny (undo) the detected change.

20 Claims, 4 Drawing Sheets

(56) References Cited

U.S. PATENT DOCUMENTS

2014/0026182 A1* 1/2014 Pearl ................... G06F 21/60
  726/1
2014/0289280 A1* 9/2014 Zichterman ....... G06F 17/30076
  707/797
2015/0278323 A1* 10/2015 Melahn ............. G06F 17/30174
  707/610
2016/0300074 A1* 10/2016 Huang ................ G06F 21/6245

OTHER PUBLICATIONS

Yupu Zhang et al., "*-Box: Towards Reliability and Consistency in Dropbox-like File Synchronization Services," Proceedings of the 5th USENIX Workshop on Hot Topics in Storage and File Systems (HotStorage '13), 2013 (Downloaded on Jan. 3, 2017 from https://www.usenix.org/system/files/conference/hotstorage13/hotstorage13-zhang.pdf).

* cited by examiner

FILE SYSTEM WARNINGS FOR MOVES OF SHARED CONTENT ITEMS

TECHNICAL FIELD

The present technology relates to warnings provided on a computing device to alert a user to possible unintentional actions, and more specifically to file system warnings that warn of possible unintentional actions on locally stored copies of content items shared through a synchronized content management system.

BACKGROUND

When working in a shared directory of a server, a change of a content item location by one user will affect all other users of the shared directory. When a content item location is unintentionally changed, or worse, when a content item is unintentionally deleted, the unintentional action can have the undesirable consequence of a lost, or deleted content item. Fortunately, many shared directories have access restrictions that prevent at least deletions of content items, and may prevent other changes as well. Even if the shared directory doesn't have these safeguards, users are generally aware of the shared nature of the directory, and take extra care. However, some technologies can obscure their shared aspects so effectively that users still do make unintentional changes to a shared content item that affect all other users of the shared content item.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to provide warnings to users of a shared collection when users attempt to move or delete a shared content item within the shared collection. This need is even greater in the context of a synchronized content management system wherein user accounts can access shared collections directly from within their file system on their client device. In such a context, some users assume that certain types of changes such as a move or delete operation are not synchronized with a server version of the shared collection. In fact, some other technologies are well known to copy content items that are dragged from one directory to another directory in a shared collection, and especially when ostensibly moving a content item outside of the shared collection. User experiences with such technology exacerbate unintentional deletions and moves in technologies where such safeguards are not desirable or do not exist.

Solving this problem is even more difficult when user accounts do not enable kernel (or shell) level extensions that can allow an application managing a shared collection on a client device to be privy to detailed information regarding file moves, deletions, and modifications. Some user accounts do not desire kernel or shell level extensions because, for example, they may add vulnerabilities to the operating system of their computing device.

The present technology attempts to solve the above problems without resorting to any kernel (or shell) level modifications, and while still providing natural interactions with the file system (such as permitting moves, deletions, etc.) on the client device, by recognizing potentially unintentional actions and notifying a user.

Figure 1:
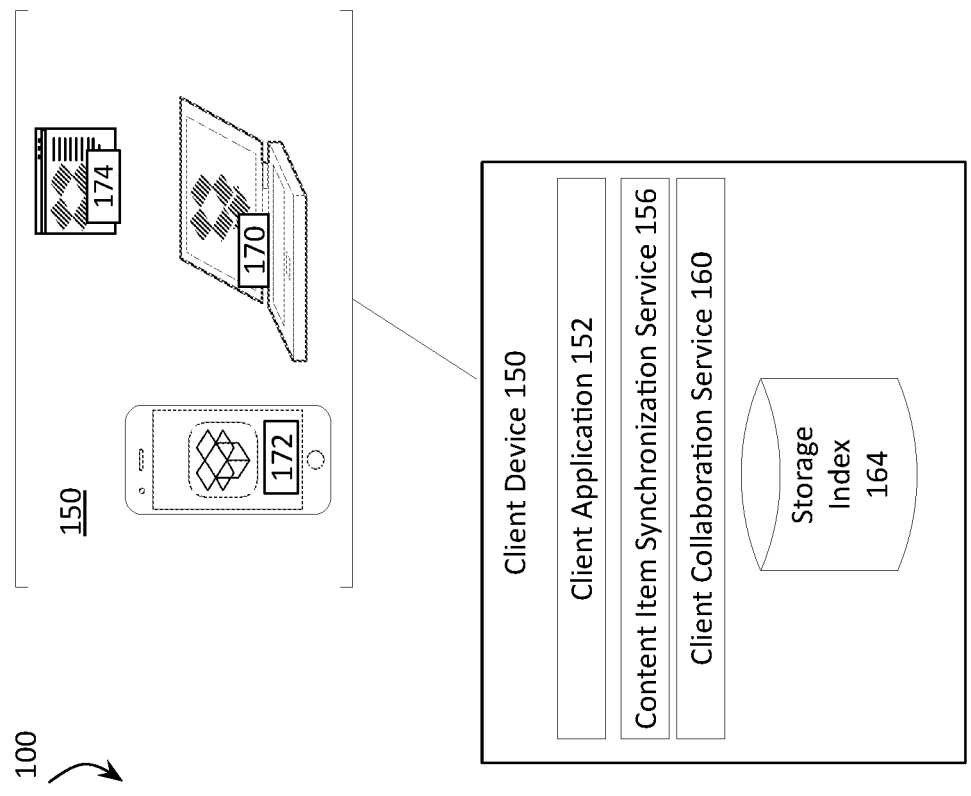
FIG. 1 shows an example of a content management system and client devices.
Figure 1:
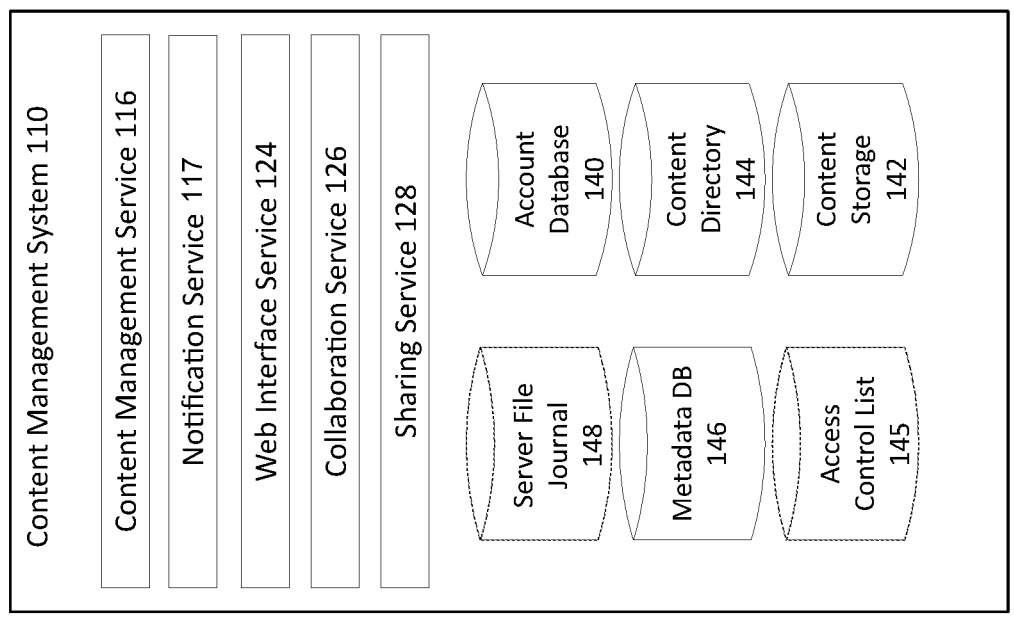

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to two or more content items stored in folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying types, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150. Content item synchronization service 156 can watch the file system of the client device to detect changes to content items (write, delete, modify, etc.), and can synchronize the changes to content management system service 120. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification.

In some embodiments storage index 164 can store some overlapping information as that stored at server file journal 148 as well as some additional information relevant to client device 150. Storage index 164 can include the unique IDs for each content item, a file path for the content item, a log of each change or update with respect to each content item, a timestamp for the change, etc. Addiitonally storage index can also store a machine ID for each content item stored at client device 150, and an iNode number. The machine ID is a unique identifier for each content item stored on a specific client device, and an iNode number is a reference number that corresponds to an reference number for the content item in an index or datastructure managed by a file system of client device 150 that includes metadata regarding the content item, including, its storage location in the file system on the client device.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface.

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 and client device 150 are presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

File System Warnings

As addressed above, the present technology provides a solution to the problem of inadvertent file moves and deletions of content items in a shared collection taking place on client device 150.

Figure 2:
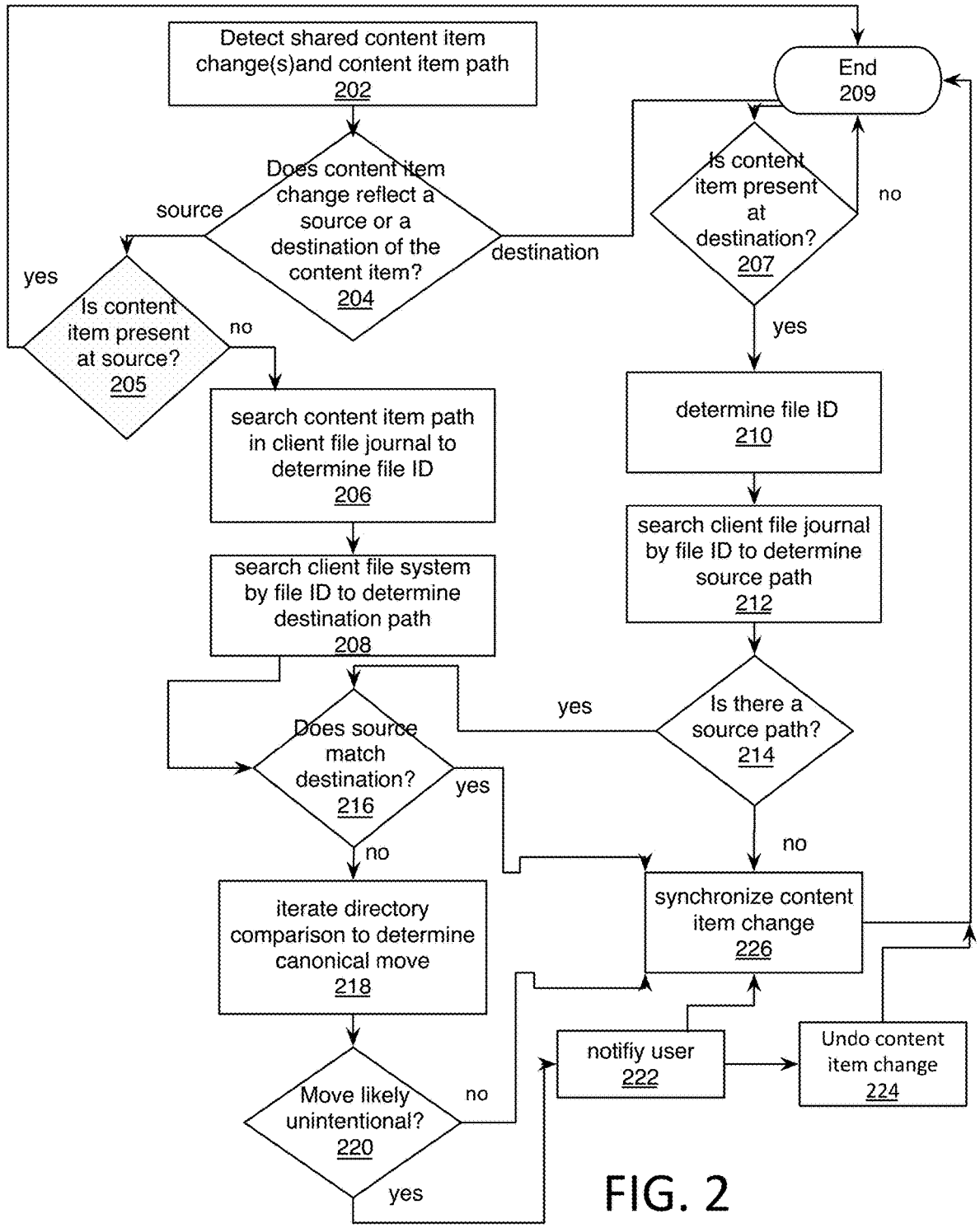
FIG. 2 shows an example method embodiment.

FIG. 2 shows an example method for determining that a likely inadvertent content item change has taken place on client device 150, and notifying a user account of the potential inadvertent content item change. Unless otherwise noted herein, the entire method shown in FIG. 2 is performed on client device 150 entirely in user application level of the software architecture, i.e., the method shown in FIG. 2 does not require any modification of or extension into an operating system kernel or shell. The kernel or shell layer handles events from the application layer, such as managing file system events, I/O events with the physical storage, while the application layer is for executing application instructions for applications that interface with the operator/user of client device 150, or applications that provide services to other applications in the application layer, but do not provide core operating system functions.

As shown in FIG. 2, content item synchronization service 156 can detect 202 at least one shared content item change event on a client device 150. In some embodiments the content item synchronization service 156 detects the content item change event by detecting that an unidentified content item is present in a shared collection and detecting the file system path corresponding to the unidentified content item, or by detecting that a previously identified content item is missing from a shared collection and detecting the file system path corresponding to the missing content item.

After determining that a content item change has been detected, the method shown in FIG. 2 attempts to determine what user action caused the content item change to be detected, and then evaluates whether this user action was likely (un)intentional 220. However, because content item synchronization service 156 is located in application space on client device 150, content item synchronization service 156 receives limited information regarding the content item change. This limited information is not enough to make the determination of whether the move was likely (un)intentional 220 so content item synchronization service 156 performs several steps to understand the data it does have, and acquire additional data.

For example, when the content item change is a folder move and the folder has additional content items stored therein, content item synchronization service 156 can detect a number of content item changes. Content item synchronization service 156 can detect content item changes such as: a folder content item deletion; a folder content item addition; deletions of each of the content items stored within a folder; and additions of each of the content items stored within a folder. Each content item addition and deletion will be detected as a content item change, but content item synchronization service 156 does not know if the content item change reflects a move of a content item, and if the content item change is a move, content item synchronization service 156 needs to determine if the file system path associated with the content item change is a source or a destination, and where the content item is going or has come from.

As such, after content item synchronization service 156 detects 202 that a content item has changed, content item synchronization service 156 determines 204 whether the detected change reflects a source or destination of the content item.

In some embodiments, content item synchronization service 156 can determine 204 whether the detected change reflects a source or destination of the content item based on whether the content item change is a write or a delete. If the change was to add or write a content item to a directory, then the file system path detected at step 202 is a destination file path. If the change is to remove or delete a content item to a directory, the file system path detected at step 202 is a source file path.

In some embodiments content item synchronization service 156 can determine 204 whether the change reflects a source or destination of the content item by checking whether the content item is present at the path. If the content item is present, then it is the destination for the content item change because the file is there. If the content item is not present, then it is the source for the content item change because the file is not there.

When content item synchronization service 156 determines 204 that the content item change and associated file system path is for the source of the content item, content item synchronization service 156 can determine 205 whether the content item is located at the source path. In embodiments where determining that a content item is not present at a path is part of the decision making process for step 204, step 205 can be redundant. However, in embodiments wherein step 204 determines the content item change reflects a source independently of whether the content item is present at the content item path, step 205 can be useful in determining that the content item change has been reversed already and does not need to be processed, as will be addressed further below.

Content item synchronization service 156 can next lookup 206 the file system path in storage index 164 to learn a unique identifier for the content item. Then content item synchronization service 156 can query the file system of operating system on client 150 for the current location (i.e., the destination) of the content item having the unique identifier. In some embodiments content item synchronization service 156 may also look up an inode (data that describes a content item in an index of the operating system) in storage index 164 and query the operating system using the inode information for the content item. The operating system of client device 150 can then return the destination file path for the content item so that content item synchronization service 156 now has both the source path and the destination path for the content item change.

When the content item change is determined 204 to refer to a destination of the content item, content item synchronization service 156 can determine whether the content item is currently located at the destination 207. In some embodiments, as addressed below, such a determination can be useful to determine that the content item change has been reversed already and no longer needs to be processed, and the method can end 209.

Assuming the content item is determined 207 to be present at the destination file path, content item synchronization service 156 can determine 210 the unique identifier directly from the content item, and use the unique identifier to search 212 storage index 164 for the last known file system path for this content item.

In some embodiments a source path is not returned 214 by search 212, then the method can proceed to synchronize the content item change 226 with content management system 110 since the content item change is not a move or a delete, but rather an addition of an unknown (and possibly new file).

When the source path is returned 214 by search 212, content item synchronization service 156 now has both the source path and the destination path for the content item change.

Content item synchronization service 156 next determines 216 if the source file system path equals the destination file system path. When content item synchronization service 156 determines 216 that the file system paths are the same, this is likely because the content item change was a content item update or modification, which can likely be safely synchronized 226. When content item synchronization service 156 determines 216 that the file system paths are not the same, then the content item change is likely a move, and may be unintentional.

As addressed above, a single move of a folder can result in several content item changes being reported. In some embodiments the present technology is synchronous and only processes one content item change at a time. In such embodiments, it is desirable to determine the single folder moved and evaluate this action as opposed to evaluating each content item change at the content item level. This can be achieved by determining for any content item change reported to content item synchronization service 156 a highest level unique path between the destination path and the source path, and comparing the highest level unique source path and the highest level unique destination path to identify 218 a highest level canonical move.

Figure 3:
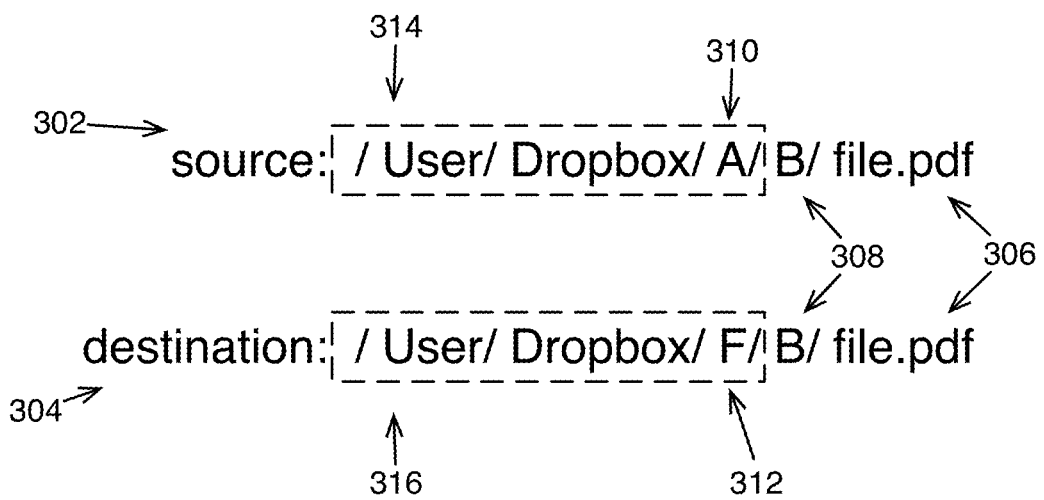
FIG. 3 shows an example source file system path and an example destination file system path.

FIG. 3 conceptually shows the function of step 218. FIG. 3 shows a source file system path 302 and a destination file system path 304. Each path identifies a location at which content item 306 "file.pdf" can be located (or was once located in the case of the source). For both source 302 and destination 304 the content item "file.pdf" is stored in a content item B 308, which is a folder in the file system of client device 150. For source 302 content item B 308 was stored in content item A 310, another folder, but is now stored in content item F 312 for destination 304.

For this set of file system paths, the highest order unique paths are represented in the dashed boxes. For the source, the highest order unique path 314 is "/User/Dropbox/A/" and for the destination, the highest order unique path 316 is "/User/Dropbox/F/." This indicates that the user moved content item B 308 from content item A 310 to content item F 312, and any content items such as file.pdf 306 were moved along with content item B 308 since they are dependent on content item B. This move can be termed a canonical move since it is the only unique move that covers all other moves. Should this move likely be unintentional 220, the easiest way to fix the move is to move content item B 308 back to content item A 310.

One way to determine the canonical move is to evaluate source file system path 302 at each level, starting from the lowest level, at "file.pdf" 306 and determine if this content item is in the correct location. Since "file.pdf" is in directory "F/B" it is not where it is expected to be. The method then iterates up the source path to content item B 308, which is not where it is expected to be; content item B 308 should be in directory A 310, not directory F 312. The method then iterates to content item A 310, which is in the expected directory "Dropbox." Once the method finds a content item in the correct location, the method can determine that the canonical move was performed on the previously examined content item—in this case content item B 308.

Once the canonical move is identified, content item synchronization service 156 can determine whether the move was likely unintentional 220. Using the example shown in FIG. 3, content item synchronization service 156 has identified that the canonical move was of content item B 308 from directory A 310 to directory F 312. Content item synchronization service 156 can utilize at least one heuristic to determine if the move was likely unintentional 220. One such heuristic can be if content item A 310 is a shared collection, and content item F 312 is not a shared collection, then content item synchronization service 156 can assume that the move was unintentional because moving content item B 308 to a directory that is not shared also causes content item B 308 to not be shared (content item B will inherit the properties of its directory). As such, this move would have taken a shared content item, once synchronized with content management system 110, and removed it from shared collection A 310 in other users accounts. This is true whether the other users' accounts attempted to access content item B 308 using web interface service 124, or on their respective client device.

When the move is not likely unintentional (i.e., it may be intentional according to the heuristics) the content item change can be synchronized 226 to the content management system.

When the move is likely unintentional, content item synchronization service 156 can notify 222 the user using a notification in a graphical user interface displayed on client device 150. In some embodiments the notification can include a selectable control effective to undo the move or accept the move. If the user confirms the move using the selectable control, the content item change can be synchronized 226 to content management system 110. If the user acknowledges that the move was unintentional by using the selectable control, the content item change can be undone 224.

Content item synchronization service 156 can queue all content item changes detected 202 for synchronization in a synchronization queue, but with the present technology, content item synchronization service 156 does not synchronize the content item changes in the queue until the content item change is approved to be synchronized.

In some embodiments the move can be undone 224 by replacing the file path associated with the content item that needs to be moved back to its original location with the file system path for its original location. Additionally, content item synchronization service 156 can remove the content item change from the synchronization queue.

In some embodiments, prior to moving a content item back to its original location one or more checks can be performed to make sure that the content item should be moved back. Conceptually these checks are designed to make sure everything related to the content item is as content item synchronization service 156 expects it to be and that no subsequent events might call into question the conclusion of heuristics applied at 220. For example, the unique identifier of the content item to be moved is checked to make sure it matches the unique identifier utilized in steps 208 and 212. In another example, a time stamp of the content item change is checked to make sure it still reflects the time of change detected at 202. Once these checks pass, the content item change can be undone 224.

Importantly, the content item change is not synchronized until the method shown in FIG. 2 is completed so as to not affect other users of the shared content item(s).

As addressed above, in some instances a single content item move can result in several related content item changes being reported, but analyzing any one of the related content item moves should be sufficient to render the several related content item changes moot because a determination of one content item move can apply to all of the related content item moves. This scenario can be handled, as addressed above at 207, wherein, if the content item change reflects a destination, but the content item is not in the destination, this can indicate that the content item change has been undone. Likewise, this scenario can be handled at 205, if the content item change reflects a source, but the content item is still located at the source, this can indicate that the content item change has been undone.

In some embodiments, related content moves can be identified when they refer to the same source file system path. If the content item change was already undone, content item synchronization service 156 can recognize a source that would be subject to the same canonical move as identified in 218 and ignore the content item change as having already been handled.

In some embodiments, content item synchronization service 156 may learn or detect 202 that the content item change is a move (as opposed to a copy or add) at step 202. In such embodiments, several determinations such as 205, 207, 214, and 216 shown in FIG. 2 may not be needed since they work, at least in part, to confirm that the content item change is a move or delete action (a delete action can be considered a move, except that the destination is a recycle bin on client device 150).

In some embodiments, the method shown in FIG. 2 is synchronous. In some embodiments, the method shown in FIG. 2 is at least partially asynchronous. For example, in some embodiments, step 220 wherein heuristics are applied to determine if a move was likely unintentional, can include some rules that might take more time to run than is desired. In such embodiments, content item synchronization service 156 can determine that the determination 220 is taking longer than allowed for a content item move, and continue to process the content item changes. However, content item changes effected by the same canonical move 218 can be batched for processing once the original content item change has completed processing to determine if the move was unintentional 220.

While throughout this description it has been described that content item changes are not undone until it is determined that the content item change is likely unintentional, in some embodiments the change can be immediately undone, and thereafter it can be determined if the move should have been permitted. When the move should have been permitted content item synchronization service 156 can redo the move. Sometimes users may select multiple files/folders to do batch move/deletion. In such embodiments similar kinds of events can be queued to show a single notification for the batched moves/deletions to avoid notifying users multiple times for each action in the batch. In some embodiments, the queueing can be done through a timer to quarantine similar kinds of moves and if there has not been any new events of similar kinds beyond a certain time threshold, the single notification can be displayed.

Figure 4:
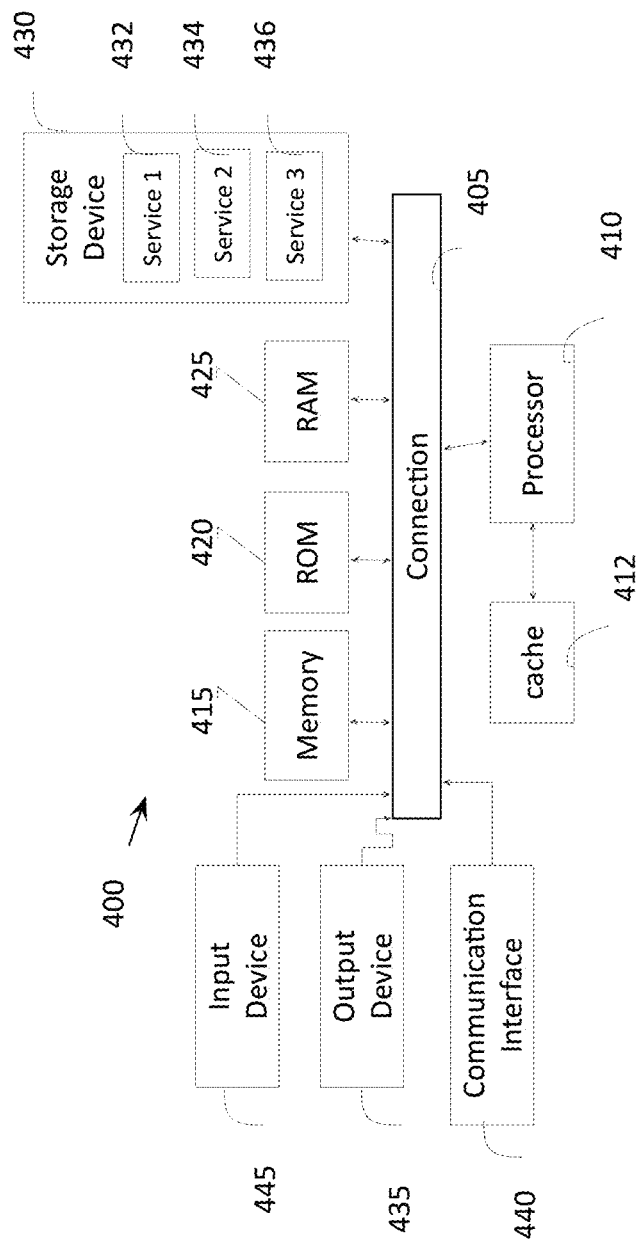
FIG. 4 shows an example of a system for implementing certain aspects of the present technology.

FIG. 4 shows an example of computing system 400 in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) and random access memory (RAM) to processor 410. Computing system 400 can include a cache of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. At least one non-transitory computer readable medium comprising instructions, the instructions, when executed by a computing system, cause the computing system to:

detect, by a content management synchronization service at a client device, a content item change event on the client device, wherein the content item change event is associated with a user account of a content management system and wherein the content item change event pertains to a shared content item accessible to at least one other user account of the content management system;

compare, by the content management synchronization service, a source file system path for the content item change event with a destination file system path for the content item change event to determine a canonical move causing the content item change event;

determine, by the content management synchronization service, that the content item change event is the canonical move of the shared content item from the source file system path that is shared with the at least one other user account to the destination file system path that is not shared with the at least one other user account causing the shared content item to become unavailable to the at least one other user account of the content management system, wherein the destination file system path is accessible to the user account;

after determining that the content item change event will result in the shared content item being unavailable to the at least one other user account of the content management system, display a notification on the client device causing the content item change event, wherein the notification informs the user account associated with the content item change event that the content item change event will result in making the shared content item unavailable to the at least one other user account; and when a selection of the notification to undo the canonical move is received, return the shared content item to the source file system path, and when a selection of the notification to continue with the canonical move is received, synchronize the content item change event with the content management system.

2. The at least one non-transitory computer readable medium of claim 1, wherein the instructions are executed in an application layer on the computing system.

3. The at least one non-transitory computer readable medium of claim 1, wherein the instructions to detect the content item change event, detect that the content item change event is a move event.

4. The at least one non-transitory computer readable medium of claim 1, including instructions to:

detect a file system path for a location within a file system that the content item change event occurred;

determine whether the content item change event describes the source file system path or the destination file system path of the shared content item; and when the content item change event describes the source file system path, learn the destination file system path, and when the content item change event describes the destination file system path, learn the source file system path.

5. The at least one non-transitory computer readable medium of claim 4, wherein the destination file system path is learned by the computing system by executing the instructions to:

lookup the source file system path in a storage index on the client device to obtain a unique identifier for the shared content item that used to be stored at the source file system path; and query a client device file system to learn a current location of a content item having the unique identifier, the current location being the destination file system path.

6. The at least one non-transitory computer readable medium of claim 4, wherein the source file system path is learned by the computing system by executing the instructions to:
  determine a unique identifier for the shared content item stored at the destination file system path; and
  lookup the unique identifier in a storage index on the client device to obtain a most recent known path storing a content item having the unique identifier, the most recent known path being the source file system path.

7. The at least one non-transitory computer readable medium of claim 1, wherein the canonical move is determined by the instructions effective to cause the computing system to:
  evaluate the source file system path, wherein the source file system path may contain a plurality of levels of content items, starting with a lowest level, and determine whether the shared content item at an evaluated level of the source file system path is currently stored at a location identified by the source file system path;
  when the shared content item at the evaluated level of the source file system path is not currently stored at the location identified by the source file system path, iterate the evaluation of the source file system path at a progressively higher level content item in the source file system path; and
  when the shared content item at the evaluated level of the source file system path is currently stored at the location identified by the source file system path, determine that a last content item that was determined to not be currently stored at the location identified by the source file system path is the shared content item that was moved in the canonical move.

8. The at least one non-transitory computer readable medium of claim 1, wherein the source file system path for the content item change event is associated with a shared directory and the destination file system path for the content item change event is associated with an unshared directory.

9. The at least one non-transitory computer readable medium of claim 1, wherein the content item change event is a content item addition describing an addition of the shared content item to the destination file system path, or content item deletion describing a deletion of a content item from the source file system path, and wherein the instructions are effective to cause the computing system to:
  determine that the content item deletion or the content item addition is part of a content item move when the source file system path does not match the destination file system path for the content item.

10. A system for synchronizing shared content item changes from a client device to a content management system, the system comprising:
  a processor;
  a storage index configured to store a log of all content item changes synchronized to the content management system, the storage index including a unique identifier for each content item, and a system file path identifying a location in a storage of the client device that a copy of a shared content item is stored;
  an operating system of the client device having a kernel layer for managing file system events and I/O events for the storage, and an application layer for executing application instructions; and
  a content item synchronization service resident in the application layer and configured to:
    detect a content item change event on the client device, wherein the content item change event is associated with a user account of the content management system and wherein the content item change event pertains to a shared content item accessible to at least one other user account of the content management system,
    compare a source file system path for the content item change event with a destination file system path for the content item change event to determine a canonical move causing the content item change event, wherein the destination file system path is accessible to the user account,
    determine that the move causing the content item change event will result in making the shared content item unavailable to the at least one other user account of the content management system,
    after determining that the move will result in making the shared content item unavailable, display a notification on the client device causing the content item change event, wherein the notification informs the user account associated with the content item change event that the content item change event will result in making the shared content item unavailable to the at least one other user account, and
    when a selection of the notification to undo the canonical move is received, return the content item to the source file system path, and when a selection of the notification to continue with the canonical move is received, synchronize the content item change event with the content management system.

11. The system of claim 10, wherein the content item synchronization service is configured to detect a file system path for the location within a file system that the content item change event occurred, to determine whether the content item change event describes the source file system path or the destination file system path of the content item, and when the content item change event describes the source file system path, learn the destination file system path, and when the content item change event describes the destination file system path, learn the source file system path.

12. The system of claim 10, wherein the source file system path for the content item change event is associated with a shared directory and the destination file system path for the content item change event is associated with an unshared directory.

13. A method comprising:
  detecting, by a content management synchronization service at a client device, a content item change event on the client device, wherein the content item change event is associated with a user account of a content management system and wherein the content item change pertains to a shared content item accessible to at least one other user account of the content management system;
  comparing, by the content management synchronization service, a source file system path for the content item change event with a destination file system path for the content item change event to determine a canonical move causing the content item change event;
  determining, by the content management synchronization service, that the content item change event is the canonical move of the content item from the source file system path that is shared with the at least one other user account to the destination file system path that is not shared with the at least one other user account causing the content item to become unavailable to the at least one other user account of the content management system, wherein the destination file system path is accessible to the user account;

in response to determining that the content item change event will result in the shared content item being unavailable to the at least one other user account of the content management system, displaying a notification on the client device causing the content item change event, wherein the notification informs the user account associated with the content item change event that the content item change event will result in making the shared content item unavailable to the at least one other user account; and when a selection of the notification to undo the canonical move is received, returning the content item to the source file system path, and when a selection of the notification to continue with the canonical move is received, synchronizing the content item change event with the content management system.

14. The method of claim 13, wherein the content item change event is a plurality of content item change events, the method comprising:

determining that the plurality of content item change events are related; and batching notifications for the of content item change events into a single notification.

15. The method of claim 13, wherein the content item change event includes a first content item change event and a second content item change event, and while determining that the canonical move causing the first content item change event was unintentional, complete comparing the source file system path for the second content item change event with a destination file system path for the second content item change event, the method comprising:

queuing the second content item change event to be determined whether the content item change was unintentional until the first content item change event has been determined to be unintentional.

16. The method of claim 13, wherein the determining the content item that was moved is determined by:

evaluating the source file system path, wherein the source file system path may contain a plurality of levels of content items, starting with a lowest level, and determining whether the content item at an evaluated level of the source file system path is currently stored at a location identified by the source file system path;

when the content item at the evaluated level of the source file system path is not currently stored at the location identified by the source file system path, iterating the evaluation of the source file system path at a progressively higher level content item in the source file system path, when the content item at the evaluated level of the source file system path is currently stored at the location identified by the source file system path, determining that a last content item that was determined to not be currently stored at the location identified by the source file system path is the content item that was moved; and determining that any additional content item changes having the same source file system path as the last content item that was determined to not be currently stored at the location identified by the source file system path is a related move, wherein the notification informing that applies to all determined related moves.

17. The method of claim 13, wherein the source file system path for the content item change event is associated with a shared directory and the destination file system path for the content item change event is associated with an unshared directory.

18. The at least one non-transitory computer readable medium of claim 1, wherein the notification is displayed only on the client device.

19. The method of claim 13, wherein the notification is displayed only on the client device.

20. The at least one non-transitory computer readable medium of claim 1, wherein the canonical move is associated with a move of a parent content item containing the content item.

* * * * *